(12) United States Patent
Wohlgemuth et al.

(10) Patent No.: US 10,986,556 B2
(45) Date of Patent: Apr. 20, 2021

(54) CIRCUIT FOR MONITORING A DATA PROCESSING SYSTEM

(71) Applicant: WAGO VERWALTUNGSGESELLSCHAFT MBH, Minden (DE)

(72) Inventors: Christopher Wohlgemuth, Minden (DE); Christian Voss, Minden (DE)

(73) Assignee: WAGO Verwaltungsgesellschaft mit beschraenkter Haftung, Minden (DE)

(*) Notice: Subject to any disclaimer, the term of this patent is extended or adjusted under 35 U.S.C. 154(b) by 0 days.

(21) Appl. No.: 16/429,442

(22) Filed: Jun. 3, 2019

(65) Prior Publication Data
US 2019/0289524 A1 Sep. 19, 2019

Related U.S. Application Data

(63) Continuation of application No. PCT/IB2017/001269, filed on Oct. 19, 2017.

(30) Foreign Application Priority Data

Dec. 3, 2016 (DE) ............ 10 2016 014 417.3

(51) Int. Cl.
*H04W 40/08* (2009.01)
*G06F 11/26* (2006.01)
(Continued)

(52) U.S. Cl.
CPC ........ *H04W 40/08* (2013.01); *G06F 11/0757* (2013.01); *G06F 11/26* (2013.01); *G06F 11/20* (2013.01)

(58) Field of Classification Search
CPC .... H04W 40/08; G06F 11/0757; G06F 11/20; G06F 11/26
See application file for complete search history.

(56) References Cited

U.S. PATENT DOCUMENTS

| | | | | |
|---|---|---|---|---|
| 7,178,069 B2* | 2/2007 | Hashimoto | ......... | G06F 11/0736 701/1 |
| 2003/0053547 A1* | 3/2003 | Aberl | ............. | H04L 25/028 375/257 |

(Continued)

FOREIGN PATENT DOCUMENTS

EP 2458503 A1 5/2012
JP 2017103505 A * 6/2017

OTHER PUBLICATIONS

International Search Report dated Feb. 16, 2018 in corresponding application PCT/IB2017/001269.

*Primary Examiner* — Deepa Belur
(74) *Attorney, Agent, or Firm* — Muncy, Geissler, Olds & Lowe, P.C.

(57) ABSTRACT

A system having a first data processing unit and a second data processing unit, wherein the first data processing unit has a first communication interface and the second data processing unit has a second communication interface, and the first communication interface and the second communication interface are connected by means of a signal line, and a monitoring unit, which is set up and provided for the purpose of resetting the first data processing unit and/or the second data processing unit to a defined operational state by means of a reset signal. The monitoring unit is connected to the signal line and provided to monitor a signal, which signals a phase of data transmission between the first communication interface and the second communication interface using a predetermined voltage level of the signal.

13 Claims, 3 Drawing Sheets

(51) Int. Cl.
  *G06F 11/07* (2006.01)
  *G06F 11/20* (2006.01)

(56) References Cited

U.S. PATENT DOCUMENTS

| | | |
|---|---|---|
| 2007/0112990 A1 | 5/2007 | Hayashita |
| 2007/0240019 A1 | 10/2007 | Brady et al. |
| 2008/0151792 A1* | 6/2008 | Taich .................. H04L 7/033 370/294 |
| 2011/0119420 A1 | 5/2011 | Hata |
| 2011/0128089 A1* | 6/2011 | Teramoto ............ H04L 25/0272 333/33 |
| 2011/0208885 A1 | 8/2011 | Kwek et al. |
| 2013/0346835 A1* | 12/2013 | DeCesaris ........... H03M 13/098 714/800 |
| 2018/0105183 A1* | 4/2018 | Kollmer ............. G06F 11/0739 |

* cited by examiner

CIRCUIT FOR MONITORING A DATA PROCESSING SYSTEM

This nonprovisional application is a continuation of International Application No. PCT/IB2017/001269, which was filed on Oct. 19, 2017, and which claims priority to German Patent Application No. 10 2016 014 417.3, which was filed in Germany on Dec. 3, 2016, and which are both herein incorporated by reference.

BACKGROUND OF THE INVENTION

Field of the Invention

The present invention relates to a circuit for monitoring a data processing system. In particular, the present invention relates to resetting a data processing unit of the system from any error condition to a defined operational state.

Description of the Background Art

In devices which are controlled by microcontrollers, often an external "watchdog" is used for program run monitoring, which triggers a control signal (reset signal) if an application is no longer properly executed in the controller. The microcontroller and the device controlled by the microcontroller can be reset by means of this control signal.

For this purpose, the external "watchdog" is often connected to a port pin of the microcontroller and is triggered (i.e., signally addressed) by the application in the controller in a defined time frame. In case of a deviation from the defined time frame, the "watchdog" can then assume improper execution of the application and reset the microcontroller and the device controlled by the microcontroller to a defined operational state (which, for example, corresponds to the state of the microcontroller directly after switching on the microcontroller).

SUMMARY OF THE INVENTION

It is therefore an object of the present invention to improve the prior art.

In an exemplary embodiment, the present invention provides a system that includes a first data processing unit and a second data processing unit, wherein the first data processing unit has a first communication interface and the second data processing unit has a second communication interface and the first communication interface and the second communication interface are connected by means of a signal line, and a monitoring unit which is set up and provided to reset the first data processing unit and or the second data processing unit to a defined operational state by means of a reset signal, wherein the monitoring unit is connected to the signal line by means of a monitoring line and is also set up and provided to monitor a signal, which is transmitted from the first communication interface via the signal line to the second communication interface and which signals a data transmission phase between the first communication interface and the second communication interface using a predetermined voltage level of the signal, for the regularity in the occurrence of data transmission phases, and to trigger the reset signal in the event of a deviation.

The term "data processing unit" can be be understood in particular to be an electronic device which processes digitally encoded data (according to a predetermined schedule), that is, transforms input data into output data, i.e., determines output data from input data. Furthermore, the term "communication interface" can be understood to be in particular an interface (for example, a connection) via which the exchange of digitally encoded data between electronic devices is made possible. Further, the term "signal line" can be understood to be in particular a hardwired conductive line via which electrical signals can be exchanged between electronic devices. In addition, the term "data transmission phase" can be understood to be in particular a continuous period limited by a start and an end, during which data is exchanged between electronic devices.

The first data processing unit includes a microcontroller and the second data processing unit includes a shift register.

The term "microcontroller" can be understood to be, for example, a semiconductor chip that includes a processor. Furthermore, the term "shift register" can be understood to be, for example, memory elements connected in series, of which the memory content can be shifted during a duty cycle from one memory element to a subsequent memory element.

Advantageously, the first communication interface comprises a first Synchronous Serial Interface and the second communication interface comprises a second Synchronous Serial Interface.

The term "Synchronous Serial Interface "can be understood in particular to be an interface which is set up to establish a connection between two electronic devices, wherein a transmission clock signal is applied to the first signal line and a data signal synchronized with the transmission clock signal is applied to the second signal line.

The first communication interface can have a first Serial Peripheral Interface, SPI, and the second communication interface can have a second SPI, and the monitored signal is a load signal of the first SPI.

The signal line has a first and a second section of which the potential is decoupled from one another by a potential separation, wherein the first section is connected to the first communication interface and the second section is connected to the second communication interface.

The system further includes a third data processing unit, wherein the third data processing unit has a third communication interface, and the first communication interface and the third communication interface are connected by a second signal line, wherein the monitoring unit is further configured and provided to reset the third data processing unit by means of a second reset signal from an error condition to a defined operational state, wherein the monitoring unit is connected by means of a second monitoring line to the second signal line and is further configured and provided to monitor a second signal, which is transmitted from the first communication interface via the second signal line to the third communication interface and which signals a data transmission phase between the first communication interface and the third communication interface using a predetermined voltage level of the second signal, for the regularity in the occurrence of transmission phases, and to trigger the second reset signal in case of a deviation.

An inventive method includes the monitoring of a signal, which is transmitted from a first communication interface of a first data processing unit via a signal line to a second communication interface of a second data processing unit and signals data transmission phases between the first communication interface and the second communication interface using a predetermined voltage level, for the regularity in the occurrence of data transmission phases, and the triggering of a reset signal which resets the first data processing unit and/or the second data processing unit to a defined operational state in the event of a deviation from the regularity.

The first data processing unit can include a microcontroller and the second data processing unit includes a shift register.

The first communications interface can have a first Serial Peripheral Interface, SPI, and the second communication interface can have a second SPI, and the monitored signal can be a load signal of the first SPI.

The method further comprises receiving of measurement data from the second data processing unit, generating of control data based on the measurement data received from the second data processing unit, signaling of a first data transmission phase between the first communication interface and the second communication interface using the predetermined voltage level of the signal, and transmitting the control data from the second communication interface to the first communication interface during the first data transmission phase.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
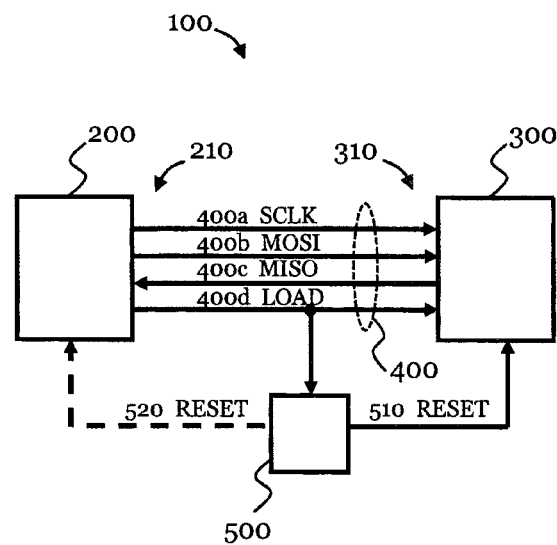
FIG. 1 illustrates an exemplary embodiment of the system according to the invention.

FIG. 1 shows a system 100, comprising a first data processing unit 200 (master) and a second data processing unit 300 (slave). The first data processing unit 200 includes a first Serial Peripheral Interface communication interface 210 (SPI communication interface) and the second data processing unit 300 includes a second SPI communication interface 310. The first SPI communication interface 210 and the second SPI communication interface 310 are interconnected by the signal lines 400a-400d. In this context it should be noted, however, that the invention is not limited to two data processing units 200 and 300 connected by an SPI bus or to a certain number of signal lines 400, but may also be implemented using other Synchronous Serial Interfaces or interfaces in general which signal data transmission phases via a signal line 400b-400d.

As shown in FIG. 1, the four signal lines 400a-400d include a signal line 400a for the transmission of a clock signal (Serial Clock, SCLK), a signal line 400b for the transmission of data from the first data processing unit 200 to the second data processing unit 300 (Master Output Slave Input, MOSI), a signal line 400c for the transmission of data from the second data processing unit 300 to the first data processing unit 200 (Master Input Slave Output, MISO) and a signal line 400d for the transmission of a signal (LOAD), which signals a data transmission phase between the first communication interface 200 and the second communication interface 300 (e.g., using a predetermined voltage level of the signal line 400d).

Figure 2:
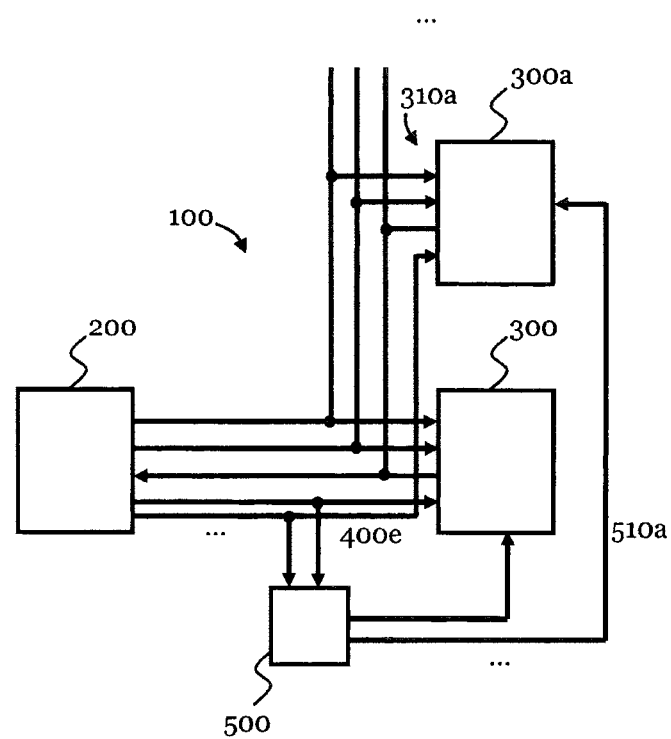
FIG. 2 illustrates an exemplary embodiment of the inventive system.

Although FIG. 1 shows only a first data processing unit 200 and a second data processing unit 300, it should be understood that the system 100, as shown in FIG. 2, may include other data processing units 300a (slaves) of which the communication interfaces 310a are also connected to the signal line 400a, the signal line 400b and the signal line 400c, and which have a separate signal line 400e for transmitting a signal, which signals a data transmission phase between the first communication interface 210 and the communication interface 310a of the respective other data processing unit 300a. In this case, the signals which signal data transmission phases between the first communication interface 210 and the communication interface 310a of the respective further data processing unit 300a can be unambiguously assigned to the respective other data processing unit 300a, whereas signals that are transmitted via the signal lines 400a-400c (without further indicators) do not allow unambiguous assignment.

As shown in FIG. 1 and FIG. 2, the system 100 additionally comprises a monitoring unit 500 which is connected to the second data processing unit 300 by means of a signal line 510. The monitoring unit 500 is set up and provided to reset the second data processing unit 300 from an error condition to a defined operational state by means of a reset signal (RESET) transmitted via the signal line 510. For this purpose, the monitoring unit 500 monitors the signals (LOAD) transmitted via the signal line 400d.

Monitoring of the signals (LOAD) transmitted via the signal line 400d makes it possible in the presence of the above-mentioned further data processing units 300a, which are also connected to the signal lines 400a-400c, to selectively monitor the communication between the first data processing unit 200 and the second data processing unit 300 and, based thereon, to selectively reset the second data processing unit 300. From sole monitoring, for example, of the signals (MOSI and/or MISO) transmitted via the signal line 400b and/or the signal line 400c, without further indicators, however, it would only be possible to infer the resetting of the second data processing unit 300 data connected with the first data processing unit 200 and the further data processing units 300a, i.e. the overall system 100 (including the first data processing unit 200). This is true since in a failure or (partial) failure of the communication, sole monitoring of the signals (MOSI and/or MISO) transmitted via the signal line 400b and/or the signal line 400c without further indicators would not indicate as to whether the communication between the first data processing unit 200 and the second data processing unit 300, or between the first data processing unit 200 and a further data processing unit 300a, is disturbed or has failed.

In order to detect the error condition, the monitoring unit 500 is connected to the signal line 400d by means of a monitoring line, and is further configured and provided to monitor the signal (LOAD), which signals a data transmission phase between the first communication interface 210 and the second communication interface 310 and is transmitted from the first communication interface 210 via the signal line 400d to the second communication interface 310, for a regularity in the occurrence of data transmission phases and, in case of a deviation, to conclude the presence of an error condition. When concluding the occurrence of an error condition, the second data processing unit 300 may then be reset by means of the reset signal from the error condition to a defined operational state.

A deviation from the regularity in the occurrence of data transmission phases can exist, for example, when a lower and/or upper limit is undershot or exceeded in terms of the number of data transmission phases within a certain period of time or within a predetermined number of duty cycles of the first data processing unit 200. Furthermore, a (strong) variation of the number of data transmission phases within a certain period of time or within a given number of duty cycles of the first data processing unit 200 may indicate a deviation from the regularity in the occurrence of data transmission phases.

Furthermore, a deviation from the regularity in the occurrence of data transmission phases can exist if the duration of a pause between data transmission phases falls below a lower and/or exceeds an upper limit, or (greatly) varies. In addition, the above conditions can be linked with one another, so that, for example, a deviation from the regularity in the occurrence of data transmission phases is then considered to be present if multiple conditions are met at the same time, or in a predetermined period of time or within a predetermined number of duty cycles of the first data processing unit 200.

Further, it is understood that the monitoring unit 500 can be connected with the first data processing unit 200 by means of a signal line 520, and be set up and provided for resetting the first data processing unit 200 by means of a reset signal (RESET) from an error condition to a defined operational state. For example, the signal line 520 may be connected to the signal line 510 such that both the first data processing unit 200 and the second data processing unit 300 can be reset to the defined operational state by means of the reset signal (RESET).

Further, the signal line 520 may be a separate signal line 520, and, in the event of a deviation from the regularity in the occurrence of data transmission phases, the monitoring unit 500 may be configured to first only reset the second data processing unit 300 to the defined operational state by means of the reset signal, and, only if an error condition occurs again, for example, within a predetermined period of time or within a predetermined number of data transmission phases, to reset the first data processing unit 200 and the second data processing unit 300 to the defined operational state.

Figure 3:
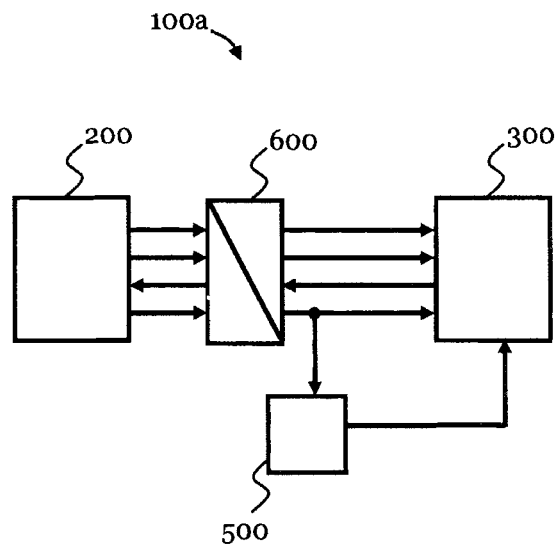
FIG. 3 illustrates an exemplary embodiment of the inventive system.

Further, as shown in FIG. 3, a potential separation 600 may be provided between the first SPI communication interface 210 and the second SPI communication interface 310. Depending on whether the first data processing unit 200 or the second data processing unit 300 are monitored, the monitoring line may then be connected to the signal line 400d between the first data processing unit 200 and the potential separation 600 or, as shown in FIG. 3, between the potential separation 600 and the second data processing unit 300. Thus, the monitoring line or the signal line 510 no longer need to be supplemented by a potential separation.

Figure 4:
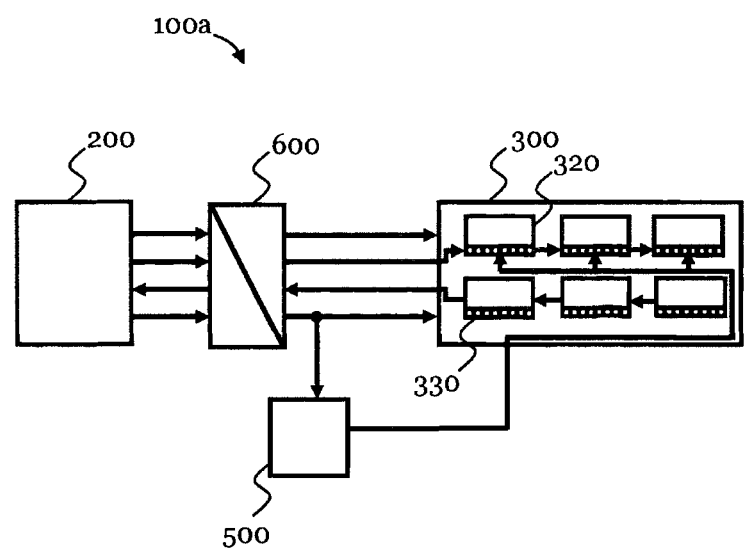
FIG. 4 illustrates an exemplary embodiment of the inventive system.

As shown in FIG. 4, the second data processing unit 300 may comprise an output shift register 320 and an input shift register 330. In this case, the output shift register 320 is connected to signal line 400b and the input shift register 330 is connected to signal line 400c. This means that during the data transmission phase, data is written from the first data processing unit 200 to the output shift register 320 and is read out from the input shift register 330. The resetting of the second data processing unit 300 to the defined operational state may then include, for example, deleting content from the output shift register 320.

In particular, the first data processing unit 200 may, during a data transmission phase, read out measurement data from the input shift register 330 and, based on the read-out measurement data, generate control data. During the data transmission phase or a subsequent data transmission phase, the control data may then be written into the output shift register 320.

Figure 5:
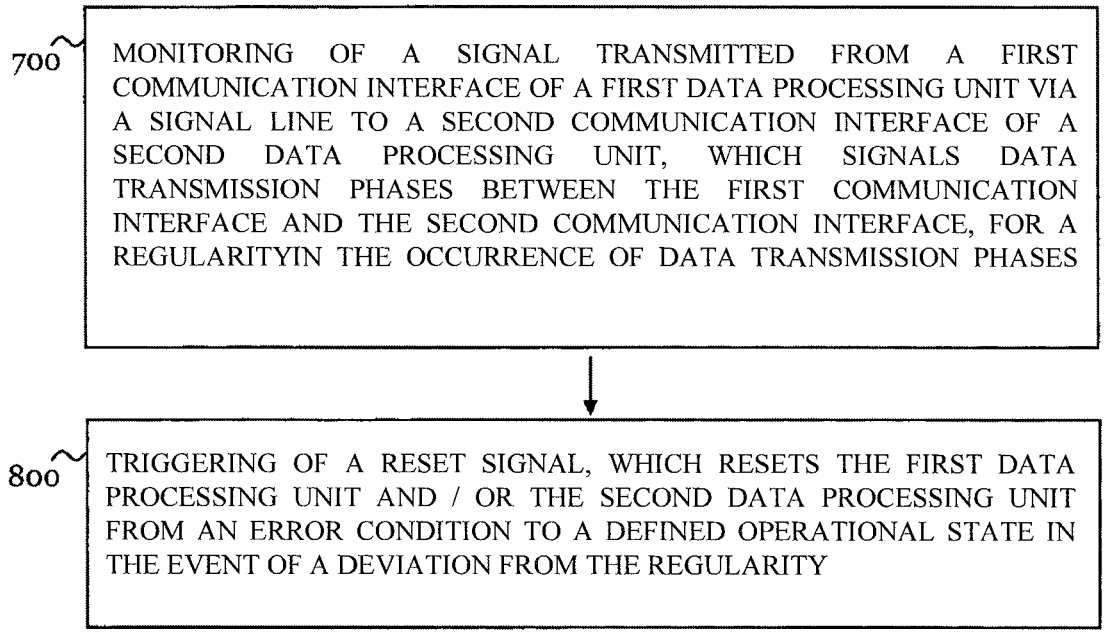
FIG. 5 illustrates a flow chart of a process for monitoring a data processing unit.

FIG. 5 shows a flowchart of a process for monitoring the first data processing unit 200. In step 700, the process starts with the monitoring of the signal line 400d with regard to the regularity in the occurrence of data transmission phases. If a deviation from the regularity is detected, the first data processing unit 200 and/or the second data processing unit 300 is reset in step 800 to a defined operational state. The type of error condition is irrelevant. To the contrary, it is sufficient to believe that a detected error condition can be resolved by a reset of the first data processing unit 200 and/or the second data processing unit 300.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:
1. A system comprising:
a first data processing unit; and
a second data processing unit, wherein the first data processing unit has a first communication interface and the second data processing unit has a second communication interface, and wherein the first communication interface and the second communication interface are connected via a signal line and two input/output lines; and
a monitoring unit having a monitoring line connected to the signal line between the first communication interface and the second communication interface at a first connection, the monitoring unit having an output to transmit a reset signal to the first data processing unit and/or the second data processing unit to reset to a defined operational state,
wherein the monitoring unit is connected to the signal line via the monitoring line and is configured to monitor a signal which is transmitted from the first communication interface via the signal line to the second communication interface and which signals a data transmission phase between the first communication interface and the second communication interface using a predetermined voltage level of the signal, wherein the monitoring unit monitors via the monitoring line a regularity in the occurrence of data transmission phases and triggers the reset signal in an event of a deviation, and
wherein the monitoring unit determines the event of deviation or an error condition based on the signals indicating the data transmission phase received from the first connection.

2. The system according to claim 1, wherein the first data processing unit comprises a microcontroller and the second data processing unit comprises a shift register.

3. The system according to claim 1, wherein the first communication interface comprises a first Synchronous Serial Interface and the second communication interface comprises a second Synchronous Serial Interface.

4. The system according to claim 1, wherein the first communication interface comprises a first Serial Peripheral Interface, SPI, and the second communication interface comprises a second SPI and the signal being monitored is a load signal of the first SPI.

5. The system according to claim 1, wherein the signal line has a first and a second section of which a potential is decoupled from each other by a potential separation, wherein the first section is connected to the first communication interface and the second section is connected to the second communication interface.

6. The system according to claim 1, further comprising:
a third data processing unit,
wherein the third data processing unit has a third communication interface and the first communication interface and the third communication interface are connected via a second signal line,
wherein the monitoring unit is connected to the second signal line via a second connection between the first communication interface and the third communication interface, the monitoring unit being configured to reset the third data processing unit to a defined operational state via a second reset signal, and
wherein the monitoring unit is connected to the second signal line via a second monitoring line and is configured to monitor a second signal, which is transmitted from the first communication interface via the signal line to the third communication interface and which signals a data transmission phase between the first communication interface and the third communication interface using a predetermined voltage level of the second signal, for the regularity in the occurrence of transmission phases, and to trigger the second reset signal in the event of a deviation.

7. A method for monitoring a first data processing unit, the method comprising:
monitoring a signal transmitted from a first communication interface of the first data processing unit via a signal line to a second communication interface of a second data processing unit, the signal in the signal line indicating data transmission phases between the first communication interface and the second communication interface using a predetermined voltage level, and monitoring for a regularity in the occurrence of data transmission phases, the signal in the signal line being monitored from a monitoring line connecting to the signal line at a first connection between the first communication interface and the second communication interface; and
triggering a reset signal, which resets the first data processing unit and/or the second data processing unit to a defined operational state in an event of a deviation from the regularity which is determined based on the signal received at the first connection.

8. The method according to claim 7, wherein the first data processing unit comprises a microcontroller and the second data processing unit comprises a shift register.

9. The method according to claim 7, wherein the first communication interface has a first Serial Peripheral Interface, SPI, and the second communication interface has a second SPI and the signal being monitored is a load signal of the first SPI.

10. The method according to claim 7, further comprising:
receiving measurement data from the second data processing unit;
generating control data at the first data processing unit based on the measured data received from the second data processing unit;
signaling the first data transmission phase between the first communication interface and the second communication interface using the predetermined voltage level of the signal; and
transmitting the control data from the first communication interface to the second communication interface during the first data transmission phase.

11. The system according to claim 1, wherein the monitoring unit determines the event of deviation or an error condition only based on the signals indicating the data transmission phase and transmits the reset signal to the first data processing unit or the second processing unit based on the monitoring of the signal line indicating the data transmission phase.

12. The system according to claim 1, wherein the monitoring unit determines the event of deviation or an error condition based on the signals indicating the data transmission phase received via the monitoring line, the monitoring line connecting at the first connection.

13. The system according to claim 1, wherein the signal line only carries the signals indicating the data transmission phase.

* * * * *